US008620213B2

United States Patent
Mallinson et al.

(10) Patent No.: US 8,620,213 B2
(45) Date of Patent: Dec. 31, 2013

(54) WIRELESS DEVICE PAIRING METHODS

(75) Inventors: Dominic S. Mallinson, Foster City, CA (US); Anton Mikhailov, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1025 days.

(21) Appl. No.: 12/647,291

(22) Filed: Dec. 24, 2009

(65) Prior Publication Data

US 2011/0159959 A1    Jun. 30, 2011

(51) Int. Cl.
*H04B 7/00*    (2006.01)
*H04B 5/00*    (2006.01)

(52) U.S. Cl.
USPC ........................................ 455/41.2; 455/41.1

(58) Field of Classification Search
USPC .............................................. 455/41.1, 41.2
See application file for complete search history.

(56) References Cited

U.S. PATENT DOCUMENTS

| | | | |
|---|---|---|---|
| 4,787,051 A | 11/1988 | Olson | 364/518 |
| 4,843,568 A | 6/1989 | Krueger et al. | 364/518 |
| 5,128,671 A | 7/1992 | Thomas, Jr. | 341/20 |
| 5,528,265 A | 6/1996 | Harrison | 345/158 |
| 6,157,368 A | 12/2000 | Faeger | 345/156 |
| 6,375,572 B1 | 4/2002 | Masuyama et al. | 463/43 |
| 7,925,022 B2 * | 4/2011 | Jung et al. | 380/270 |
| 2002/0085097 A1 | 7/2002 | Colmenarez et al. | 348/211 |
| 2004/0212589 A1 | 10/2004 | Hall et al. | 345/156 |
| 2007/0093291 A1 | 4/2007 | Hulvey | |
| 2007/0111796 A1 | 5/2007 | Giaimo, III et al. | |
| 2009/0069096 A1 * | 3/2009 | Nishimoto | 463/43 |

FOREIGN PATENT DOCUMENTS

| | | |
|---|---|---|
| EP | 2 135 651 A1 | 12/2009 |
| WO | WO 2007-061598 A1 | 5/2007 |

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

Lakshminarayanan A et al: "Practical Device Association Protocols for Wireless Enabled Personal Devices", Wireless Communications and Networking Conference, 2005 IEEE New Orleans, LA, USA Mar. 13-17, 2005, Piscataway, NJ USA, IEEE, vol. 4, Mar. 13, 2005 pp. 2484-2489.

(Continued)

*Primary Examiner* — Yuwen Pan
*Assistant Examiner* — Xin Jia
(74) *Attorney, Agent, or Firm* — Martine Penilla Group, LLP

(57) ABSTRACT

Methods of pairing a plurality of objects in a multi-interactive object environment are presented. In one example, the method establishes communication between a first and second controller and the base computing device that identifies each controller as being active. A pairing detection algorithm executed on the base computing device is set into pairing mode to receiving signals from the controllers that indicates pairing between the first and second controllers. The base computing device detects a pairing initiation signal from the controllers, where the pair initiation signal is generated in response to detecting physical contact or a signature between the first and second controllers. The base computing device sets first and second controllers as being paired to the player.

19 Claims, 19 Drawing Sheets

(56) References Cited

OTHER PUBLICATIONS

Lakshminarayanan A et al: "Tap—Practical Security Protocols for Wireless Personal Devices", Personal, Indoor and Mobile Radio Communications, 2004, PIMRC 2004. 15 th IEEE International Symposium on Barcelona, Spain Sep. 5-8, 2004, Piscataway, NJ, USA, vol. 4, Sep. 5, 2004, pp. 2884-2888.

Stajano, F., and Anderson, R.: "The Resurrecting Duckling: Security Issues for Ad-hoc Wireless Networks", Springer Lecture Notes in Computer Science (Proceedings of $7^{th}$ Internation Workshop on Security Protocols 1999) Retrieved from the Internet: URL: http://www.cl.cam.ac.uk/{fms27/papers/1999-StajanoAnd-duckling.pdf.

* cited by examiner

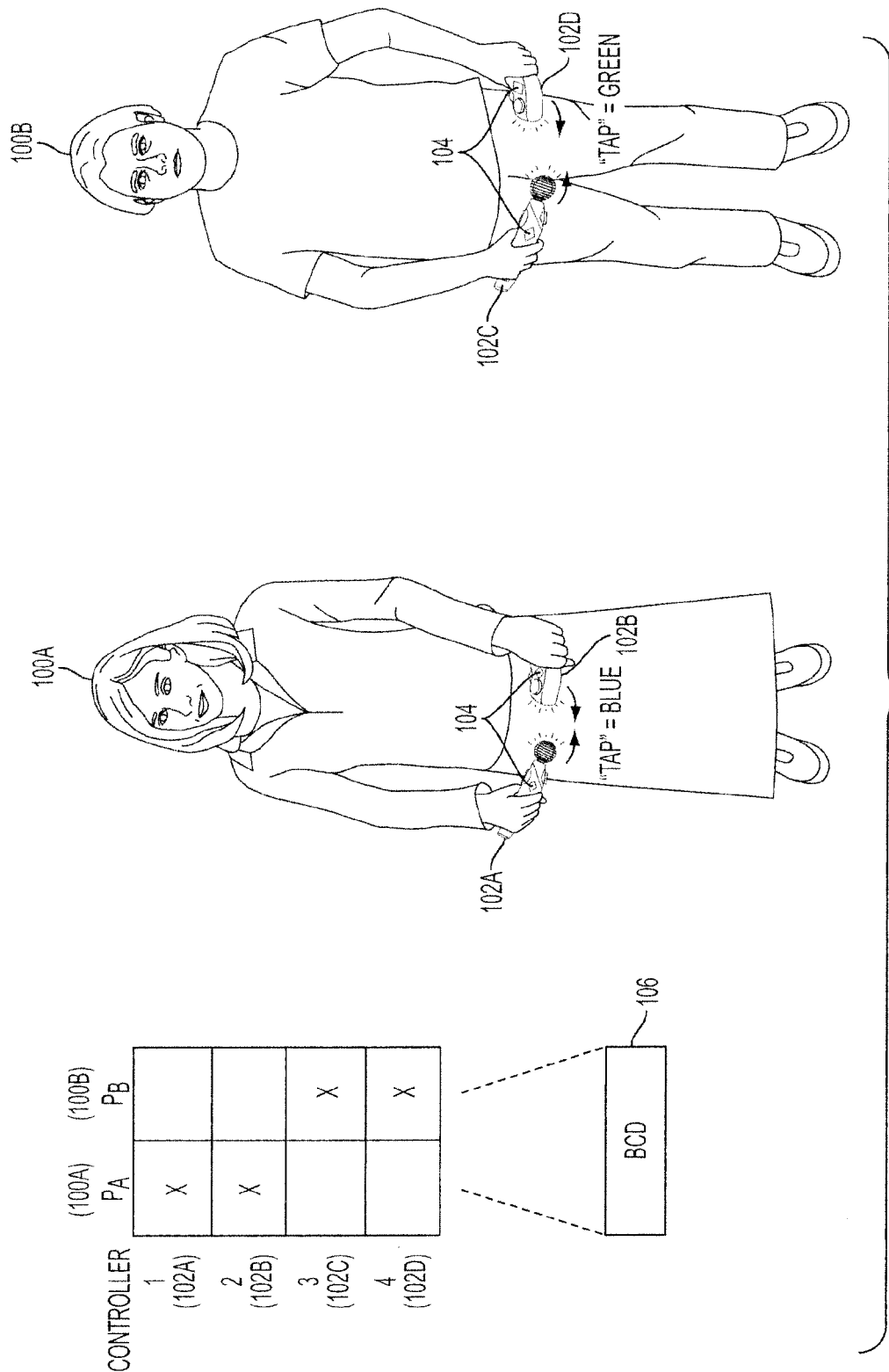

GROUPING DEVICES

SWITCHING AS A GROUP

WIRELESS DEVICE PAIRING METHODS

CROSS REFERENCE TO RELATED APPLICATIONS

This application is related to U.S. patent application Ser. No. 12/647,296, filed on the same date of this application and entitled, "Wireless Device Pairing and Grouping Methods", and U.S. patent application Ser. No. 12/647,299, filed on the same date of this application and entitled, "Wireless Device Multimedia Feed Switching", both of which are incorporated by references.

This application is further related to U.S. patent application Ser. No. 12/145,455, filed Jun. 24, 2008 and entitled, "DETERMINATION OF CONTROLLER THREE-DIMENSIONAL LOCATION USING IMAGE ANALYSIS AND ULTRASONIC COMMUNICATION"; U.S. patent application Ser. No. 12/259,181, filed Oct. 27, 2008, and entitled, "DETERMINING LOCATION AND MOVEMENT OF BALL-ATTACHED CONTROLLER"; U.S. patent application Ser. No. 12/503,846, filed Jul. 16, 2009, and entitled "DISPLAY VIEWING SYSTEM AND METHODS FOR OPTIMIZING DISPLAY VIEW BASED ON ACTIVE TRACKING"; U.S. patent application Ser. No. 12/426,186, filed on Apr. 17, 2009, and entitled "CONTROL DEVICE FOR COMMUNICATING VISUAL INFORMATION"; and U.S. Provisional Patent Application No. 61/200,973, filed on Dec. 5, 2008, and entitled "SPHERICAL ENDED CONTROLLER WITH CONFIGURABLE MODES", all of which are incorporated herein by reference.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. The problems with tracking controllers are magnified in multi-player, multi-controller gaming environments. For instance, fighting games are enhanced with each player using two controllers, as would any game where the position at multiple locations is tracked.

It is in this context that embodiments of the invention arise.

SUMMARY

Broadly speaking, the present invention fills these needs by providing a method and apparatus for pairing devices to a user or users through a base computing device. Although the term "pairing" is described in terms of connecting two devices, pairing should be broadly construed to include connections between multiple devices and/or users, depending on the desired context of interaction. If multiple devices are paired, the interaction can operate to allow a group to participate on a communication, interactive, business or gaming activity. The group of devices can be for one user, or the group of devices can be joined from multiple users. It should be appreciated that the present invention can be implemented in numerous ways, including as a method, a system, or a device. Several inventive embodiments of the present invention are described below.

In accordance with one aspect of the invention, a method of pairing a plurality of controllers to a player through a base computing device in a multi-controller game is detailed. The method establishes communication between a first and second controller and the base computing device that identifies each controller as being active. A pairing detection algorithm executed on the base computing device is set into pairing mode to receiving signals from the controllers that indicates pairing between the first and second controllers. The base computing device detects a pairing initiation signal from the controllers, where the pair initiation signal is generated in response to detecting physical contact between the first and second controllers. The base computing device sets first and second controllers as being paired to the player.

In accordance with another aspect of the invention, a method for pairing devices to a base computing device in preparation for playing a game executed on the base computing device is provided. The method establishes communication between a first and second device and the base computing device that identifies each of the first and second devices as being active. A pairing detection algorithm executed on the base computing device is set into pairing mode for receiving signals from devices indicating pairing between the devices occurred. The base computing device detects a pairing initiation signal generated in response to detecting a local communication signature between the devices. After detecting the pairing initiation signal, the base computing device sets the first and second devices as being paired to the player.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 5 illustrates pairing controllers through physical contact and displaying a pairing indicator, in accordance with one embodiment of the present invention.

DETAILED DESCRIPTION

Figure 1:
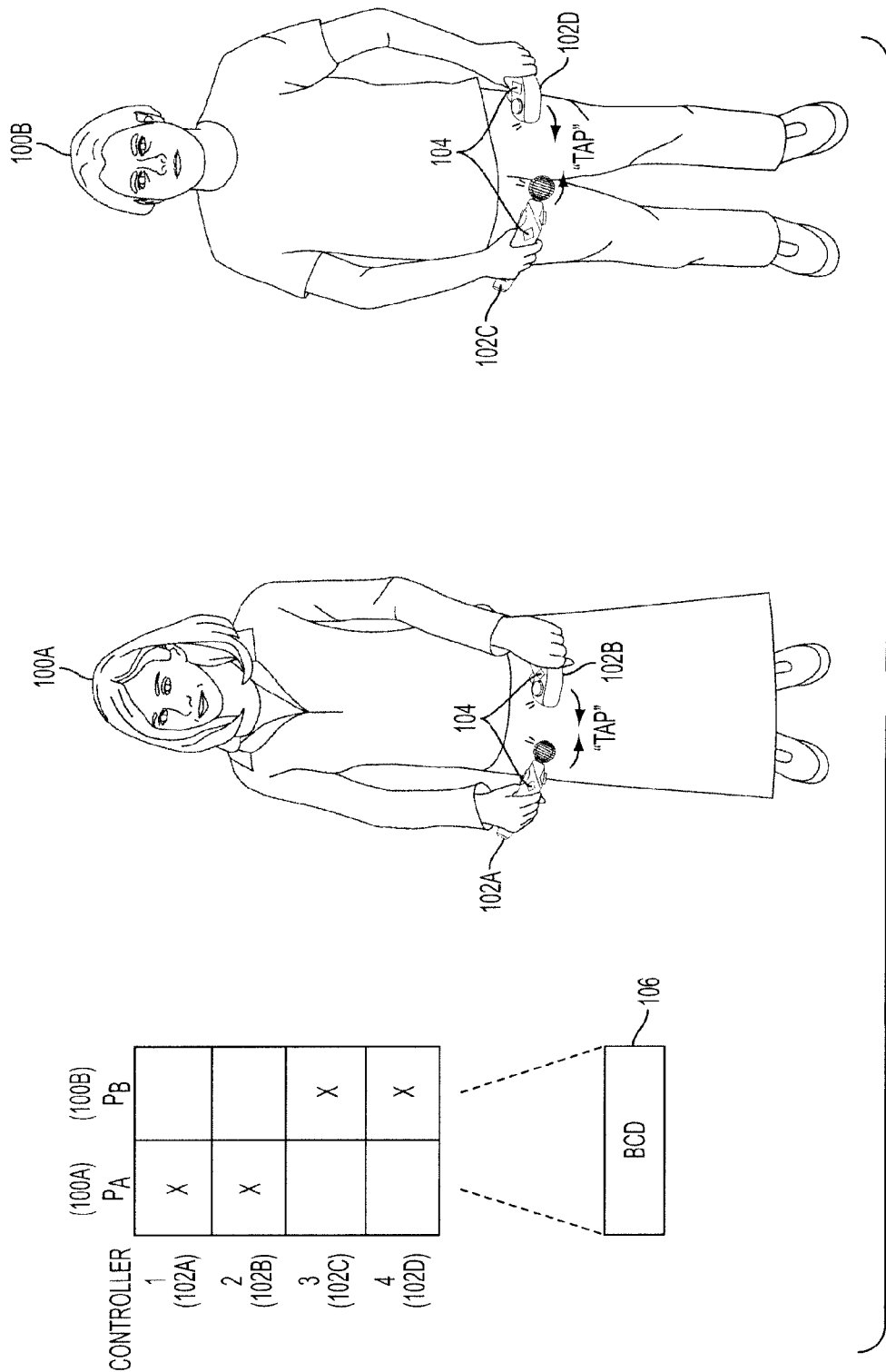
FIG. 1 illustrates pairing controllers and associating the paired controllers with a player, in accordance with one embodiment of the present invention.

The following embodiments describe an apparatus and method for pairing objects for wireless communication. Such objects can be held, worn, and/or touched by humans when used to interface with another object or a computing device. The computing device can be local to the user or remote through an internet connection. Examples of the objects include controllers used by players to interface with a base computing device, smart phones, communication devices, wireless glasses, and other electronic devices. When the objects are controllers, the controllers can be used to interface with a computer program that is executed on a computing system (local or remote). The interfacing can be for game playing, communication, interfacing with a graphical icon on a display, triggering an action or motion gesturing.

As mentioned above, the pairing should be broadly construed to include connections between multiple devices and/or users, depending on the desired context of interaction. If multiple devices are paired, the interaction can operate to allow a group to participate on a communication, interactive session, business interaction to share documents, gaming activity, a mix of these activities. Paired groups can also be allowed to switch into and out of communication context feeds or sessions. For instance, a group of people that are using paired devices may together switch into a movie, out of a movie, into a game, out of a game, into a conference discussion and back to a movie. Still further, one user may pair multiple of its devices together, and that single user can switch into and out of feeds (e.g., multimedia feeds, contexts, etc.). This dynamic switching provides increased functionality that is coupled to the pairing operations between devices. It will be obvious, however, to one skilled in the art, that the present invention may be practiced without some or all of these specific details. In other instances, well known process operations have not been described in detail in order not to unnecessarily obscure the present invention.

A growing area of console gaming is multiplayer gaming with multiple controllers. Games where the player uses multiple controllers require independent tracking of multiple devices by the base computing device. The problem is further complicated in the multiplayer game environment were there may be at least two players and four controllers. The base computing device needs to determine which controller is held in which hand and/or by which player. For instance, a boxing game requires tracking of the right and left hand of the user, as does a sword fighting game where the user can use a shield and sword or two weapons at a time. For multiple controllers to be used in this fashion, the controllers need to be paired to each other and associated with the player.

Pairing, as used herein, refers to the linking of multiple devices (two or more) in such a way as to enable data exchange between the paired devices and a base computing device. In other embodiments, one controllers may act as a main controller while the other one (or other ones) work(s) as a secondary controller that is commanded by the main controller. Embodiments described below illustrate methods to pair of a number of wireless controllers or peripherals to a player or between controllers and peripherals.

One way of accomplishing a richer interactive gaming experience is through the use of wireless controllers, whose movement is tracked by the gaming system in order to track the player's movements and use these movements as inputs for the game. In one embodiment, a controller is configured to operate wirelessly, which facilitates freedom of controller movement in order to interact with the base computing device. Wireless communication can be achieved in multiple ways, such as via Bluetooth® wireless link, WiFi, infrared (IR) link, ultrasound, radio frequency (RF) link, etc. For purposes of clarity, embodiments described below illustrate pairing two controllers with a player, but embodiments of the present invention can also be applied to pair any number of controllers or peripherals to a player or a group of players.

FIG. 1 illustrates pairing controllers and associating the paired controllers with a player, in accordance with one embodiment of the present invention. A pairing procedure is performed by each player 100A and 100B holding controllers 102A-D in the multi-player environment. In multi-player game configurations, each player 100A and 100B can use multiple controllers 102A-D, which requires the base computing device 106 to associate each controller 102A-D with a particular player 100A and 100B. In one embodiment, the controllers 102A-D may include an accelerometer 104, which is a device that measures acceleration and gravity induced reaction forces and can be used to sense inclination, vibration, and shock. Sensory to the user can be by way of tactile feedback. The accelerometer 104 can be used for pairing the controllers 102A-D through the base computing device 106. The base computing device 106 prompts each player 100A and 100B to perform a pairing procedure to set pairing between the controllers 102A-D associated with each player 100A and 100B. The player 100A brings the main controller 102A into physical contact with the secondary controller 102B. The accelerometer 104 detects the physical contact between the controllers 102A and 102B held by the first player 100A and the controllers 102 C and 102D held by the second player 100B. In one embodiment, the accelerometers inside of the controllers sense the spike caused by the tap and the system software recognizes the synchronized spikes (and possibly the opposite vectors for additional robustness).

In response to the physical contact, the controllers 102A-D transmit a pairing initiation signal to the base computing device 106. Physical contact should be broadly constructed to include touching, tapping, rubbing, petting, shaking, multiple taps, taps at different rates, double taps, triple taps, one tap, two taps, three taps, four taps, etc. Each combination or sub-combinations of physical contact can be correlated with a particular paring action, indication of pairing, un-pairing, etc. In one embodiment, the base computing device 106 detects the pairing initiation signal and sets controllers 102A and 102B as paired to player 100A and controllers 102C and 102D as paired to player 100B. After the controllers 102A-D are paired with the respective players 100A and 100B, the paired controllers 102A-D can be used to interface with objects on a display, control activity, make input or trigger commands or direct action of objects, and virtual figures and/or avatars. The control can be during single or multi-player games or interactivity. Still further, the base computing device 106 can be local to the user or can be remotely located over the internet. If remotely connected, the base computing device can be embodied in a network of computers, which may represent of cloud computing system of interconnected processing entities.

Figure 2:
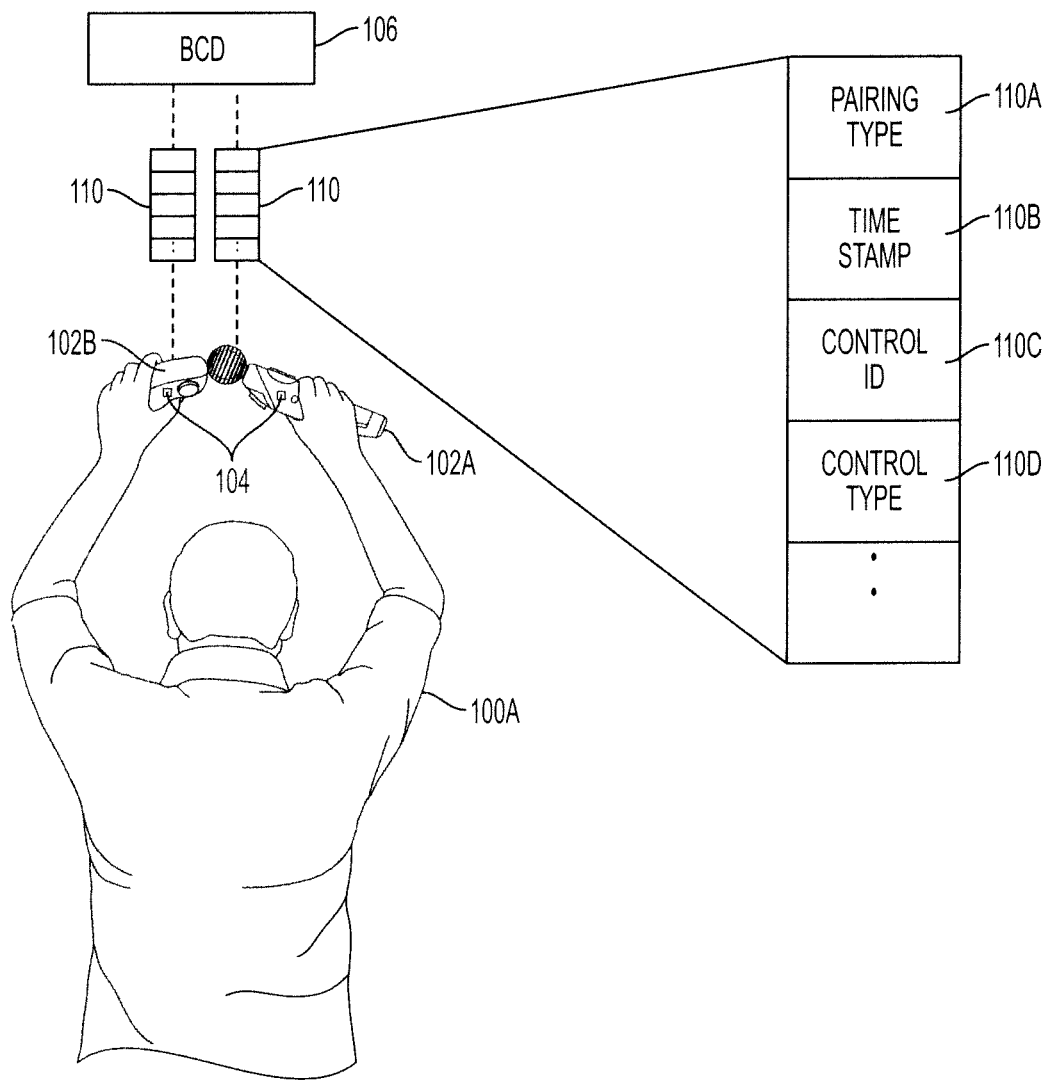
FIG. 2 illustrates pairing controllers through physical contact and a transmitted pairing initiation signal received by the base computing device, in accordance with one embodiment of the present invention.

FIG. 2 illustrates pairing controllers through physical contact and a transmitted pairing initiation signal received by the base computing device, in accordance with one embodiment of the present invention. As discussed above, after the pairing procedure is performed by the player 100A, in one embodiment, the accelerometer 104 included in the controllers 102A and 102B can detect the physical contact of tapping the controllers 102A and 102B together. For example, when each (or one) of the controllers 102A and 102B detects the physical contact in an amount above a threshold level, both (or one) of the controllers 102A and 102B transmit a pairing initiation signal 110 to the base computing device 106.

The pairing initiation signal 110 includes information used by the base computing device 106 to identify which controllers 102A and 102B in the multi-controller gaming environment are paired with the player 100A. In one embodiment, the pairing initiation signal 110 includes pairing data pertaining to the type of pairing procedure used 110A, a time stamp 110B indicating when the physical contact was detected by the controllers 102A and 102B, controller identification information 110C, and the controller type information 110D (e.g. main controller or secondary controller). Specific examples of information that may be included in the pairing initiation signal 110 are cited for illustrative purposes, and as such do not limit the scope of the present invention.

In one embodiment, the pairing detection algorithm executed on the base computing device 106 is implemented as an event loop in an event-driven program. Upon receiving the pairing initiation signal 110 from the controllers 102A and 102B, the pairing detection algorithm executed by the base computing device 106 processes the information contained in the pairing initiation signal 110. In another embodiment, the pairing detection algorithm compares the received time stamp 110B information and correlates the time stamps 110B that are closest in time as coming from controllers 102A and 102B being paired by the player 100A. It should be appreciated there will be a measurable time difference between one player 100A pairing controllers 102A and 102B and the other players pairing their controllers. This time difference is significantly larger than the time difference of the physical contact, e.g., impulse taps, being detected by the controllers 102A and 102B being paired. Therefore, the measureable time difference in the time stamps from the player 100A pairing controllers 102A and 102B and other players pairing other controllers enables the base computing device 106 to differentiate between controllers 102A and 102B being paired by one player 100A and other controllers being paired by other players.

In yet another embodiment, the controllers 102A and 102B transmits data associated with the physical contact, e.g., unmodified raw accelerometer data, to the base computing device 106. The pairing detection algorithm executed on the base computing device 106 then processes the data associated with the physical contact to detect that the pairing procedure has been performed. In this way, the act of processing the data associated with the physical contact is transferred from the controllers 102A and 102B to the base computing device 106.

Figure 3:
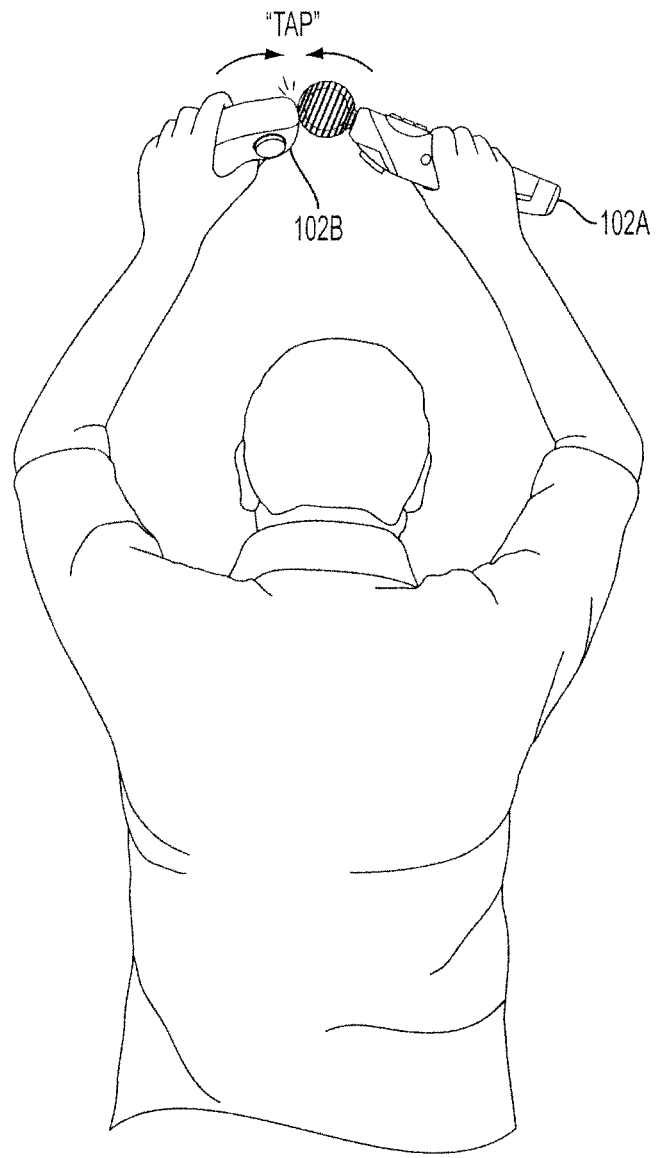
FIG. 3 illustrates pairing a secondary controller with a main controller through physical contact, in accordance with one embodiment of the present invention.

FIG. 3 illustrates pairing a secondary controller with a main controller through physical contact, in accordance with one embodiment of the present invention. Referring back to FIG. 1, the controllers held by the user in different hands are identical. Many genres of games incorporate the use of a secondary controller 102B works in tandem with the main controller 102A, where the main controller 102A and the secondary controller 102B are different. In one embodiment, the secondary controller 102B is physically smaller than the main controller 102A. In another embodiment, the main controller 102A includes more functionality than the secondary controller 102B.

Figure 4:
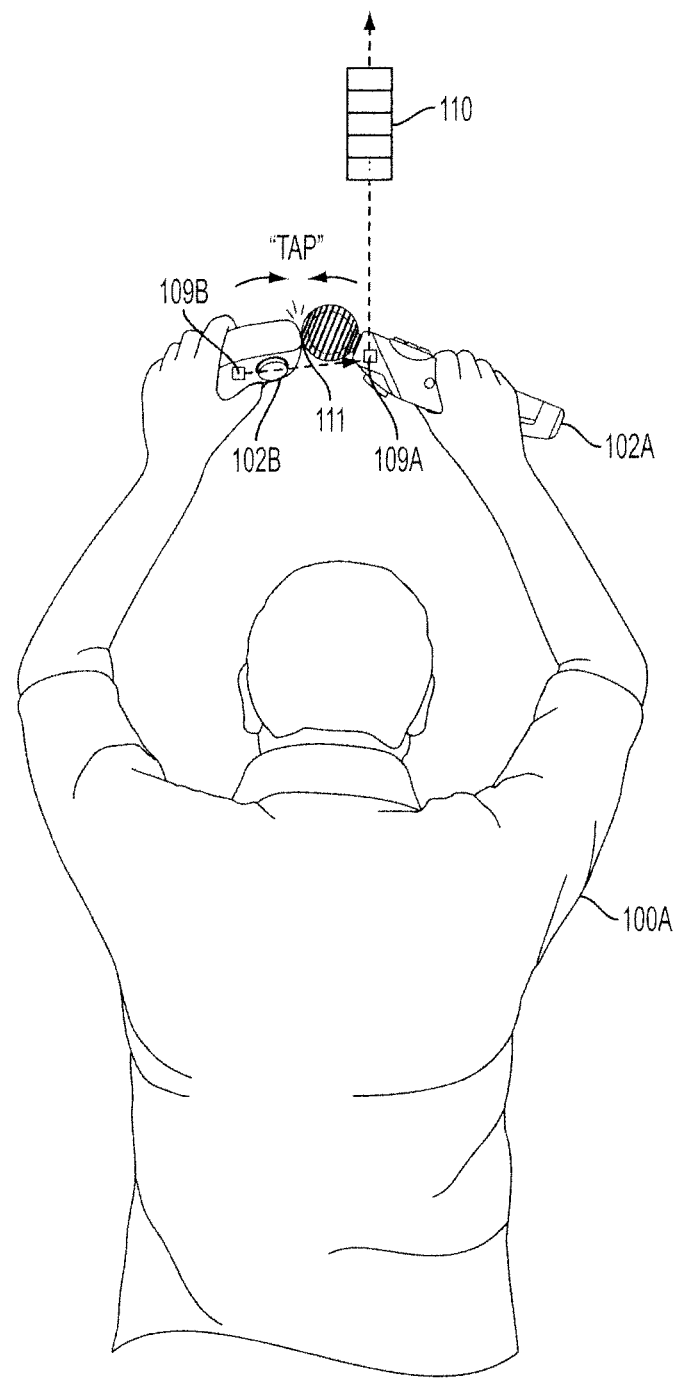
FIG. 4 illustrates pairing a secondary controller with a main controller through physical contact and transmission of a controller signature signal from the secondary to the main controller, in accordance with one embodiment of the present invention.

FIG. 4 illustrates pairing a secondary controller with a main controller through physical contact and transmission of a controller signature signal from the secondary to the main controller, in accordance with one embodiment of the present invention. The secondary controller 102B held by the player 100A may further include a local transmission interface 109B and the main controller 102A may further include a local reception interface 109A. As discussed above in reference to FIG. 3, one embodiment can be where the secondary controller 102B detects physical contact with the main controller 102A, and pairing of the controllers 102A and 102B is initiated. The secondary controller 102B may have limited communication capabilities and generation of the pairing initiation signal is performed primarily by the main controller 102A. The secondary controller 102B may further include a local transmission interface 109B, which transmits a controller signature signal 111 to the main controller 102A.

In another embodiment, the local transmission interface 109B and the local reception interface 109A are implemented using TransferJet interface. TransferJet is an interface that enables communication when close proximity is detected between two devices. In one example, this transfer technology can be used to allow high speed transmission of the controller signature signal 111 from the secondary controller 102B to the main controller 102A before the physical contact between the controllers 102A and 102B is detected.

Still further, in an embodiment that uses actual contact to trigger transfer, the controller signature signal 111 from the secondary controller 102B is received by the local reception interface 109A of the main controller 102A. The controller signature signal 111 provides information about the secondary controller 102B to the main controller 102A. In one embodiment, the controller signature signal 111 includes identification information and controller type information of the secondary controller 102B. The main controller 102A processes the received controller signature signal 111 to extract the information identifying the secondary controller 102B. The main controller 102A incorporates the information from the controller signature signal 111 and transmits the pairing initiation signal 110 to the base computing device 106. The pairing initiation signal 110 contains information about both controllers 102A and 102B.

In one embodiment, as discussed above, the pairing initiation signal 110 may include pairing data pertaining to the type of pairing procedure used, a time stamp indicating when the physical contact was detected by the main controller 102A and the secondary controller 102B, identification information for both controllers 102A and 102B, and the controller type information, such as whether the controllers held by the player 100A are a main controller 102A and a secondary controller 102B combination. In another embodiment, the state of any button on either the main controller 102A or the secondary controller 102B can be used to define or augment the data of the controller signature signal 111. Further, when two controllers (or devices) are paired, an action (e.g., button push, movement, turn, position) can direct or impact the response or activity at both controllers. This sharing of interactivity provides for a rich interactive experience shared between two or more users interacting with two or more devices.

FIG. 5 illustrates pairing controllers through physical contact and displaying a pairing indicator, in accordance with one embodiment of the present invention. Controllers 102A-D held by players 100A and 100B may further include the internal light emitters. In one embodiment, the internal light emitters can be red-green-blue (RGB) light-emitting diodes (LEDs), which can be set to a particular color hue. As discussed in reference to FIG. 1, the controllers 102A and 102B are paired with the first player 100A and controllers 102C and 102D are paired with second player 100B after tapping the controllers together. After the base computing device 106 sets the controllers 102A and 102B as being paired to the first player 100A, the color of light emitted by the controllers 102A and 102B can be used as a pairing indicator to differentiate between controllers 102C and 102D paired with another player 100B. According to an embodiment of the present invention, after pairing, the controllers 102A and 102B for a first player 100A can be set to a blue hue, while the controllers 102C and 102D for a second player 100B can be set to a green hue. In another embodiment, after pairing, each controller 102A and 102B held by the same user 100A can have different colors. For example, a controller 102A held in a player's 100A right hand could have a different shade of blue than the controller 102B held in the player's 100A left hand. Still further, as more pairs of controllers or objects are paired, the color spectrum given to each set of controllers can change or be adjusted to give more color differentiating identifiers. Specific colors are cited for illustrative purposes, and as such do not limit the scope of the present invention.

In another embodiment, the pairing indicator can be a temporary indicator to notify the player 100A that a successful pairing (or unpairing) has occurred. After which, the pairing indicator reaches a steady state for use during the game/application. For example, the LEDs may pulse or flash synchronously with the same color hue to indicate a successful pairing, and then the color hue of the LEDs of the controllers 102A and 102B can be set to a color hue required by the game. It should be appreciated the pairing indicator of a successful pairing (or unpairing) can also be implemented by other methods, such as audible feedback or haptic feedback. For instance, the controllers 102A and 102B that have been successfully paired may vibrate synchronously for a period of time, which provides haptic feedback of a successful pairing to the player 100A.

Figure 6A:
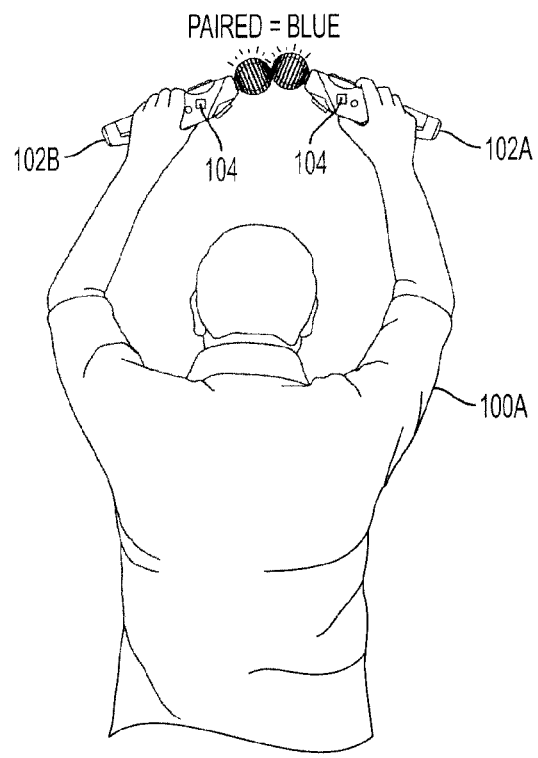
FIG. 6A-6B illustrates pairing and unpairing of controllers and changing of the pairing indicator, in accordance with one embodiment of the present invention.
Figure 6B:
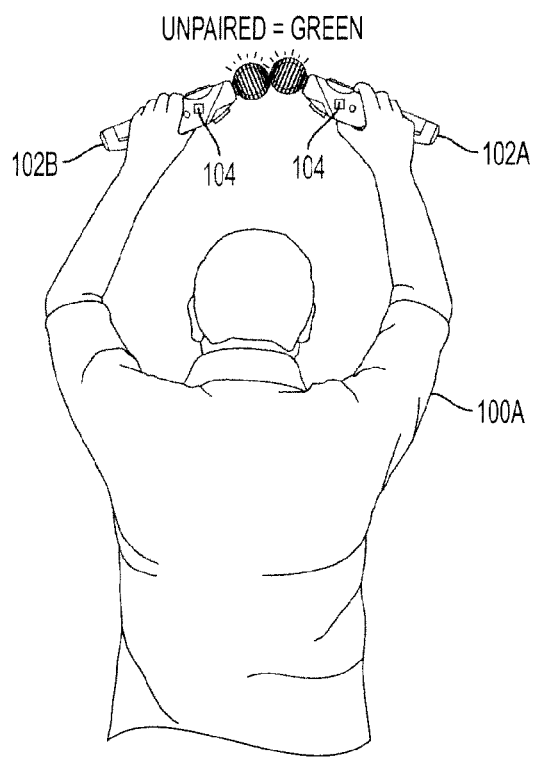

FIG. 6A-6B illustrates pairing and unpairing of controllers and changing of the pairing indicator, in accordance with one embodiment of the present invention. As discussed above, the controllers 102A and 102B held by a player 100A can be set to display a pairing indicator, for example a certain color hue. After the controllers 102A and 102B have been paired with the player 100A, additional tapping sequences can undo the pairing process and unpair the controllers 102A and 102B. In one embodiment, after pairing, the controllers 102A and 102B can display a pairing indicator, which are lights with a blue hue. Then, as illustrated in FIG. 6B, if the controllers 102A and 102B are then tapped again, the controllers 102A and 102B transmit an unpairing signal to the base computing device. Upon receiving the unpairing signal, the base computing device undoes the pairing setting of the controllers 102A and 102B. In one embodiment, the pairing indicator of the controllers 102A and 102B is changed to display lights with a green hue. In still another embodiment, users can decide to change their assigned colors by following a pre-defined tap or contact sequence. For instance, if a user taps his controllers and does not like his assigned colors, the user can decide to keep tapping until the controllers sequence through a plurality of pre-set colors. Once the user's desired color is illustrated on the controller, the user can stop tapping. To unpair, the user can issue a different sequence of taps, or a quick double-tap, for example. The color can be illustrate on the controller in many ways. For instance, the color can be shown by way of LED lights. The LED lights can be on a light bar, inside of the controller surface, on the side of the controller, on the handles of the controller, the controller grips, etc.

Figure 7:
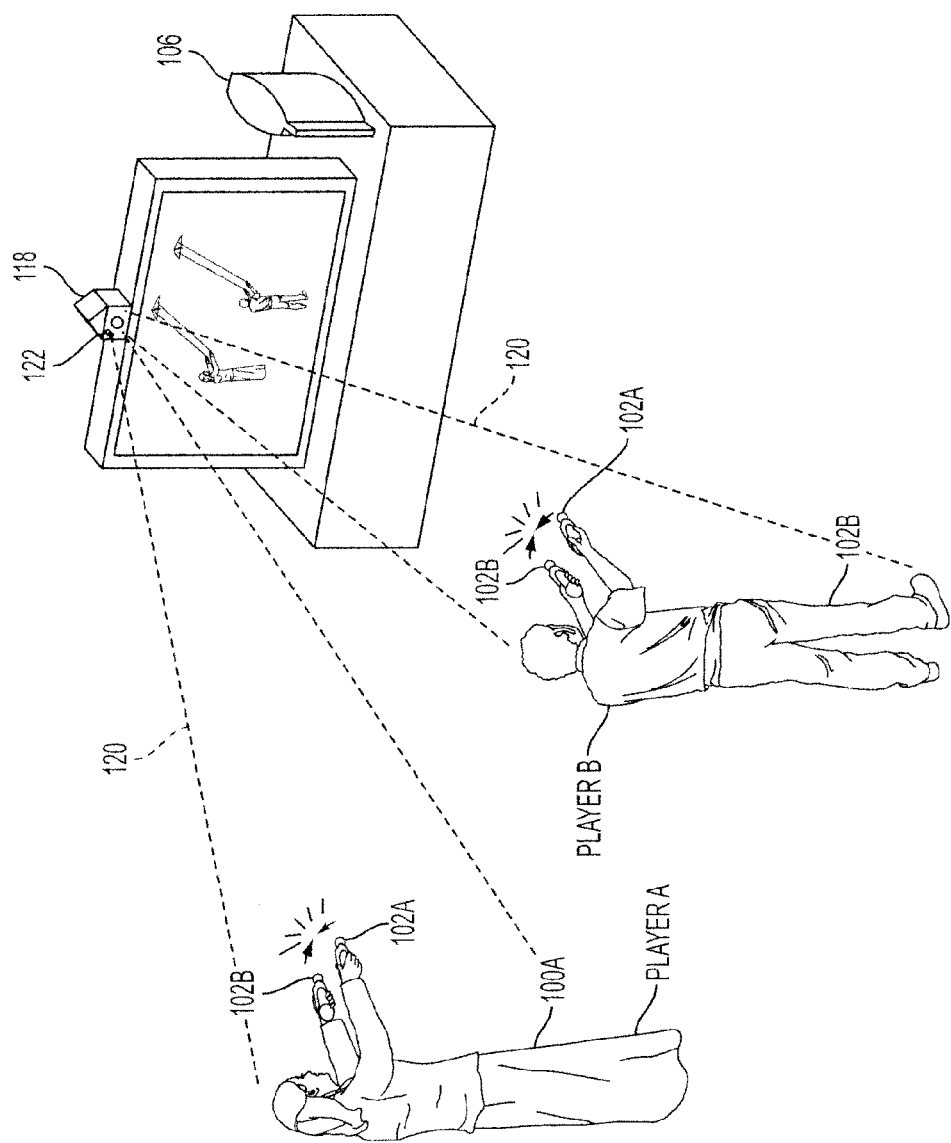
FIG. 7 illustrates pairing implemented using sound made by the controllers and an image capture device of the base computing device, in accordance with one embodiment of the present invention.

FIG. 7 illustrates pairing implemented using sound made by the controllers and an image capture device of the base computing device, in accordance with one embodiment of the present invention. The base computing device 106 may further include an associated image capture device 118. The image capture device 118 can also include a sound capture array 122, which can be used to direct the image capture device 118 toward the source of sounds made by the players 100A and 100B tapping the controllers 102A-D together. In one embodiment, the sound capture array 122 is an array of microphones that can determine the direction from which sounds are emanating. Pairing of the controllers 102A and 102B held by the first player 100A can performed by the first player 100A tapping controllers 102A and 102B together. The capture area 120 of the image capture device 118 is directed toward the sound generated by the tapping of the controllers 102A and 102B held by the first player through the sound capture array 122 of the image capture device 118. The base computing device 106 can focus attention of the image capture device 118 toward the location of the detected sound to find the controllers 102A and 102B held by the first player 100A. The controllers 102C and 102D held by the second player 100B can be paired in a similar fashion.

Another method of pairing controllers is through the use of local communication signature. A local communication signature is a localized signal transmitted by each controller and detected by the other controller. Examples of local communication signatures include: visible light, infrared radiation (IR), ultrasonic signals, etc. Embodiments described below illustrate several pairing methods which use local communication signatures between controllers to initiate pairing. Specific pairing methods and local communication signatures are provided for illustrative purposes, and as such do not limit the scope of the present invention.

Figure 8:
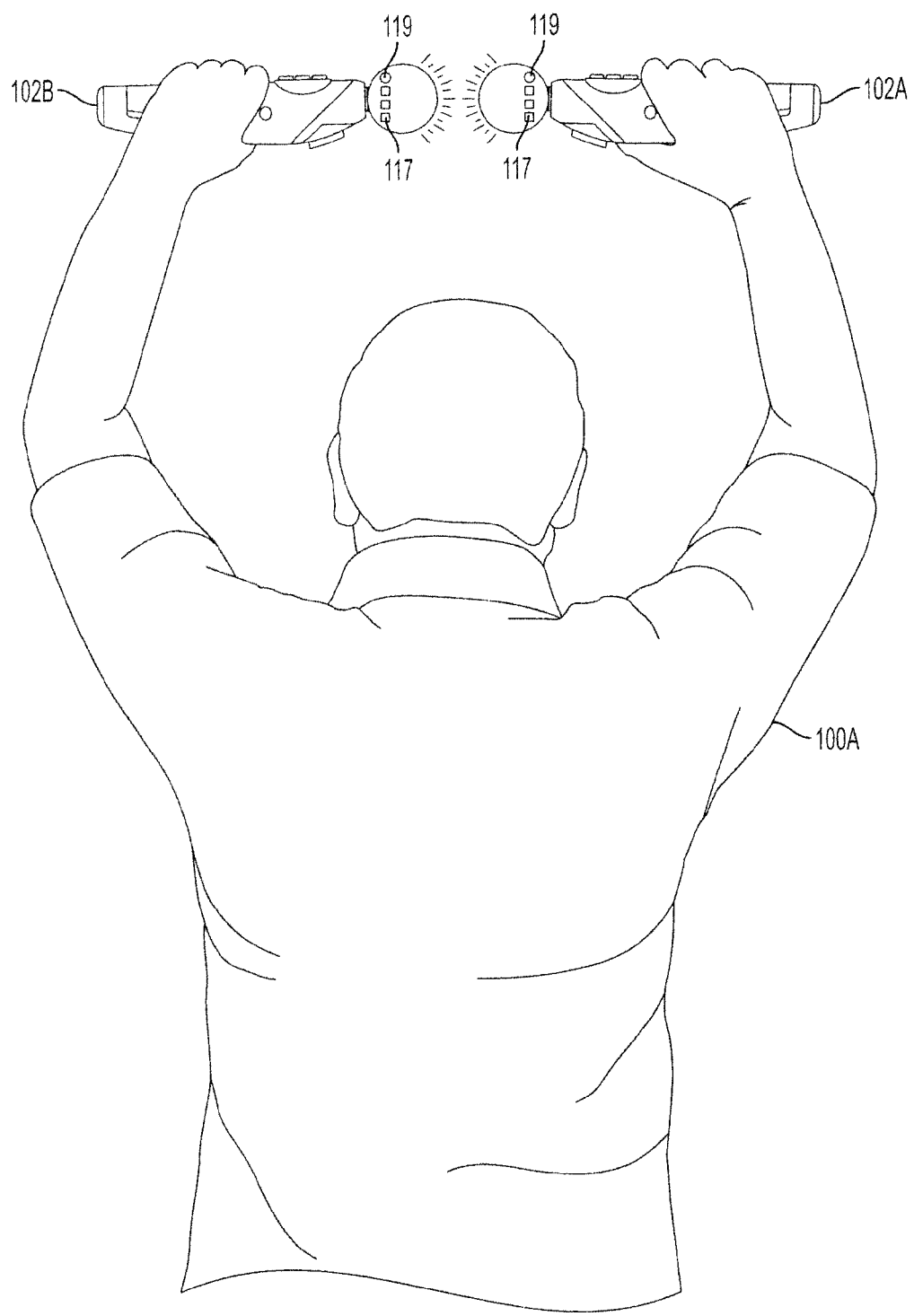
FIG. 8 illustrates pairing implemented using light emitters of the controllers, in accordance with one embodiment of the present invention.

FIG. 8 illustrates pairing implemented using light emitters of the controllers, in accordance with one embodiment of the present invention. As discussed previously, the controllers 102A and 102B can include light emitters 117. In addition to the light emitters 117, the controllers 102A and 102B can further include an optical detection device 119. Pairing between the controllers 102A and 102B can be initiated by the player 100A through a local communication signature such as visible light. The player 100A can align the light emitters 117 of the controllers 102A and 102B, such that the light emitters 117 are approximately facing each other and move controllers 102A and 102B toward each other. In this configuration, the optical detection device 119 of a controller 102A can detect the emitted light from the opposite controller 102B. In one embodiment, in response to the strength of the local communication signature detected by the optical detection device 119 being above a threshold value, each controller 102A and 102B generates the pairing initiation signal, as discussed in reference to FIG. 2.

Figure 9:
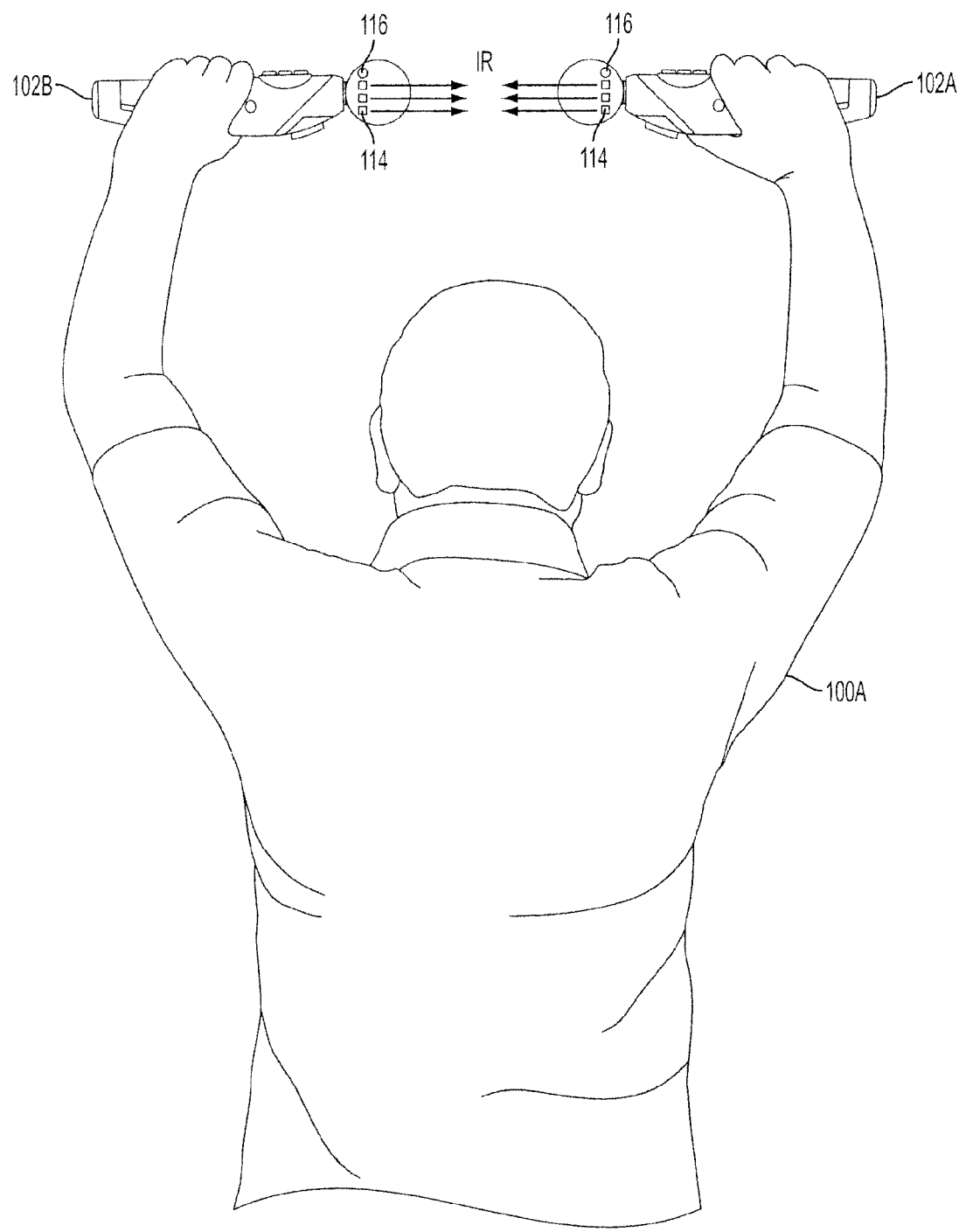
FIG. 9 illustrates pairing implemented using infrared radiation emitters of the controllers, in accordance with one embodiment of the present invention.

FIG. 9 illustrates pairing implemented using infrared radiation emitters of the controllers, in accordance with one embodiment of the present invention. The controllers 102A and 102B held by the player 100A may further include IR radiation emitters 114 and an IR detection device 116. The controllers 102A and 102B can be designed to allow the infrared radiation emitted by the IR emitters 114 to be transmitted with minimal distortion. When prompted by the base computing device, the player 100A aligns the IR emitters 114 of the first controller 102A substantially toward the IR detection device 116 of the second controller 102B. In this configuration, the infrared detector 116 contained in each controller 102A and 102B can detect the local communication signature. In one embodiment, in response to the strength of the local communication signature detected by the IR detection device 116 being above a threshold value, each controller 102A and 102B generates the pairing initiation signal, as discussed in reference to FIG. 2.

Figure 10:
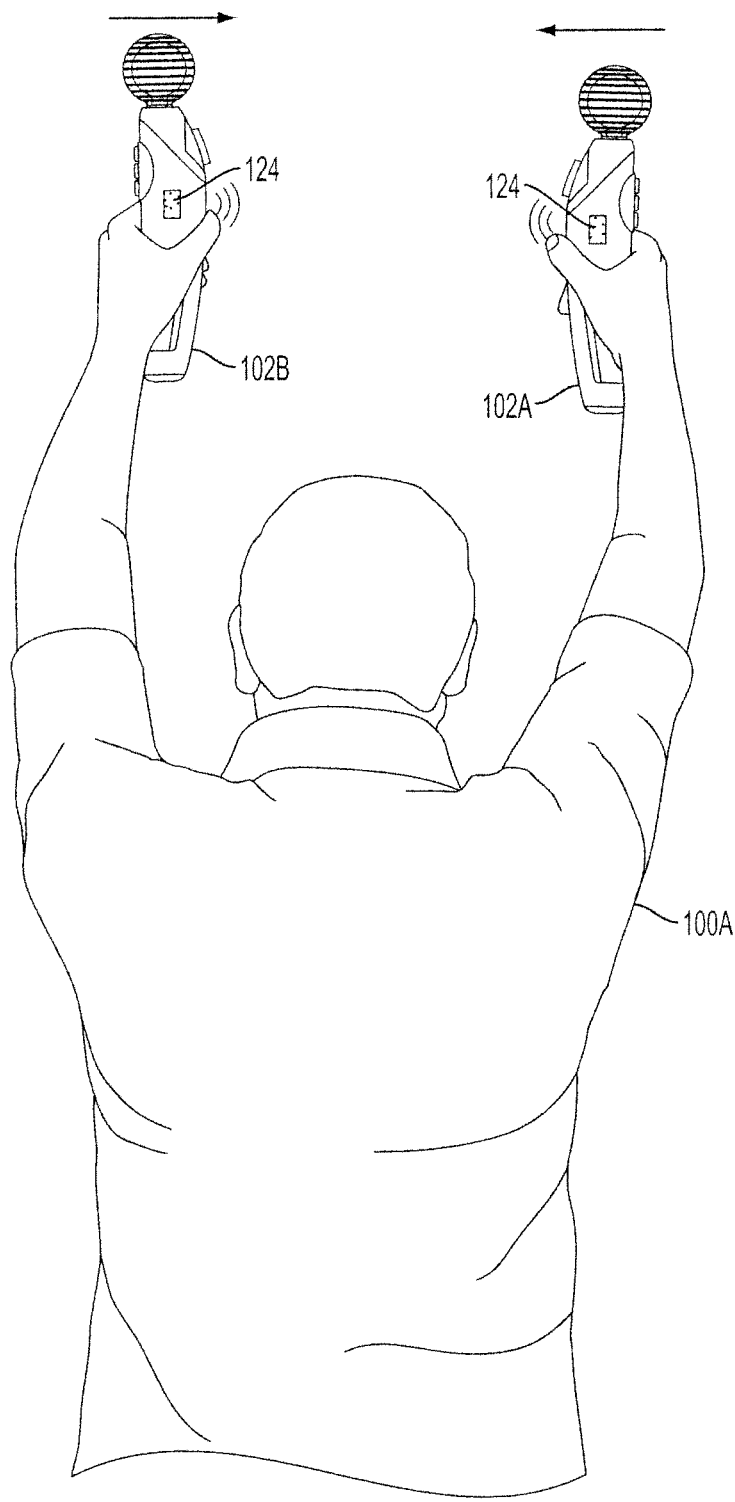
FIG. 10 illustrates pairing of the controllers using an ultrasound interface, in accordance with one embodiment of the present invention.

FIG. 10 illustrates pairing of the controllers using an ultrasound interface, in accordance with one embodiment of the present invention. Controllers 102A and 102B held by a player 100A can be configured for two-way ultrasound communications through an ultrasound interface 124 that takes data from a sound capture area of the controllers 102A and 102B. Lateral ultrasound communications can be used for communication between controllers 102A and 102B being held by the player 100A while paired and for increasing the accuracy in determining the relative locations of the controllers 102A and 102B. Pairing can be performed by the player 100A holding the first controller 102A and the second controller 102B so that the ultrasound interfaces 124 are in approximate alignment with each other and brought towards each other. The ultrasound interface 124 in each controller 102A and 102B transmits a local communication signature whose signal gets stronger the closer the controllers 102A and 102B are brought together. Once the strength of the local communication signature is above a specified threshold, each controller 102A and 102B transmits a pairing initiation signal to the base computing device.

Figure 11A:
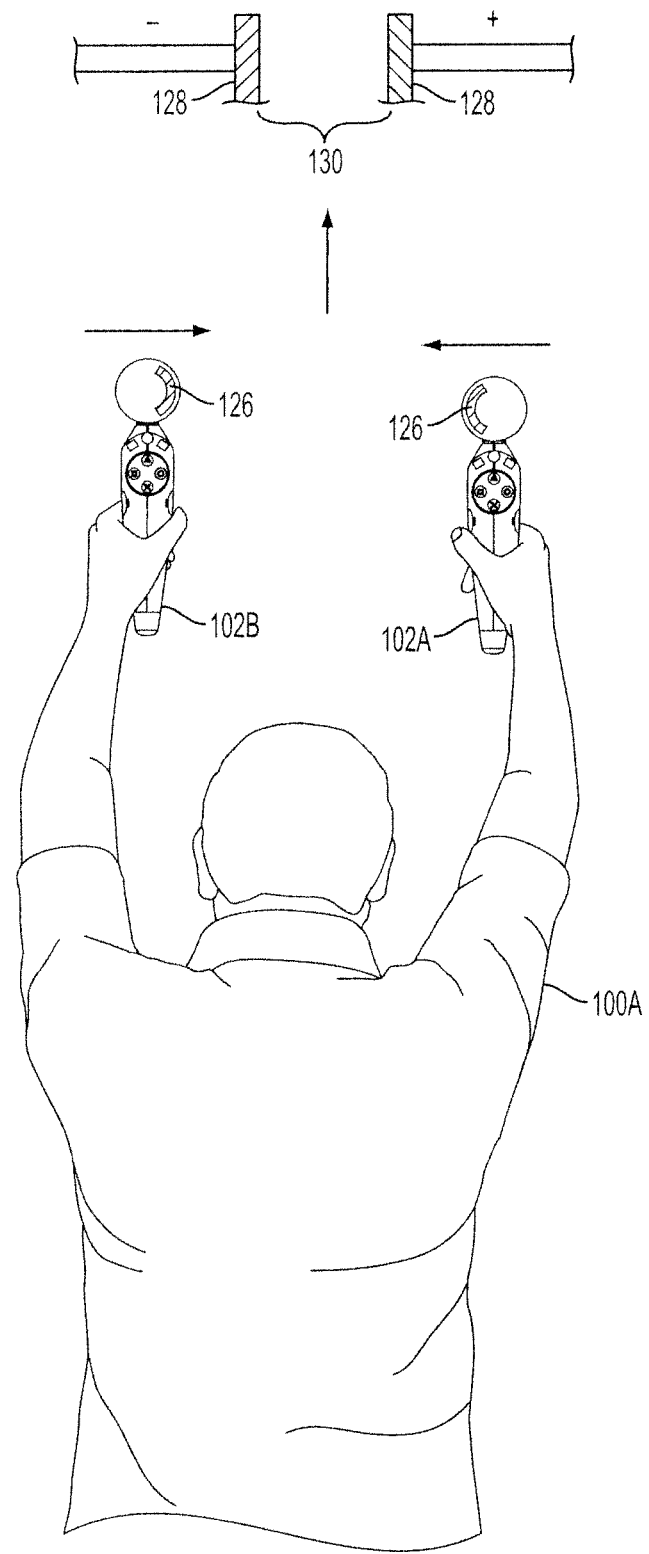
FIG. 11A illustrates pairing of the controllers using capacitive elements, in accordance with one embodiment of the present invention.

FIG. 11A illustrates pairing of the controllers using capacitive elements, in accordance with another embodiment of the present invention. The controllers 102A and 102B held by a player 100A can further include a capacitive element 126. To pair the controllers 102A and 102B, a voltage (e.g. positive voltage) is applied to the capacitive element 126 of the first controller 102A and voltage of the opposite polarity (e.g. negative voltage) is applied to the capacitive element 126 of the second controller 102B. The applied voltages cause the capacitive elements 126 to effectively form a parallel plate capacitor 128, with the space 130 between the parallel plates 128 serving as the dielectric. As the voltage is applied to the capacitive elements 126, the player 100A moves the controllers 102A and 102B toward each other. The capacitive elements 126 detect an increase in capacitance resulting from the decreased dielectric thickness 130 (i.e. distance between controllers 102A and 102B). In response to the detected local communication signature (i.e. capacitance) being above a threshold value, the controllers 102A and 102B transmit a pairing initiation signal to the base computing device. In this embodiment, actual "contact" need not happen, so long as the surfaces of the controllers are brought close enough to one another. Close enough can be within 1-20 millimeters, for example.

Figure 11B:
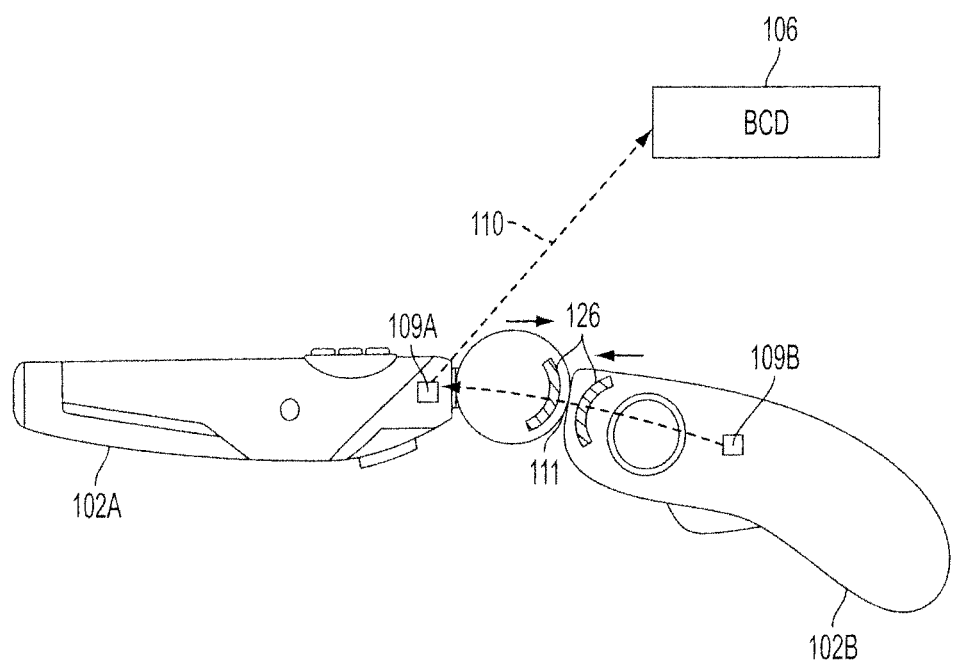
FIG. 11B illustrates pairing of a main controller and a secondary controller using capacitive elements and transmission of the pairing initiation signal by the main controller, in accordance with one embodiment of the present invention.

FIG. 11B illustrates pairing of a main controller and a secondary controller using capacitive elements and transmission of the pairing initiation signal by the main controller in accordance with one embodiment of the present invention. As discussed previously, some game configurations use a secondary controller 102B in conjunction with a main controller 102A. Referring back to FIG. 11A, pairing the controllers 102A and 102B can be performed through a capacitive local communication signature. As the main controller 102A and the secondary controller 102B are moved towards each other, the capacitance detected by the capacitive elements 126 increases. Once the local communication signature detected by the capacitive elements is above the threshold value, the local transmission interface 109B of the secondary controller 102B transmits a controller signature signal 111 to local reception interface 109A of the main controller 102A, as discussed in reference to FIG. 4. The main controller 102A incorporates the pairing data contained in the controller signature signal 111 into the pairing initiation signal 110 that is transmitted to the base computing device 106. As discussed in reference to FIG. 4, the controller signature signal 111 can be transmitted by the secondary controller 102B to the main controller 102A using any number of methods. One is through the TransferJet interface, through sound, through IR, through cameras, etc.

Figure 12A:
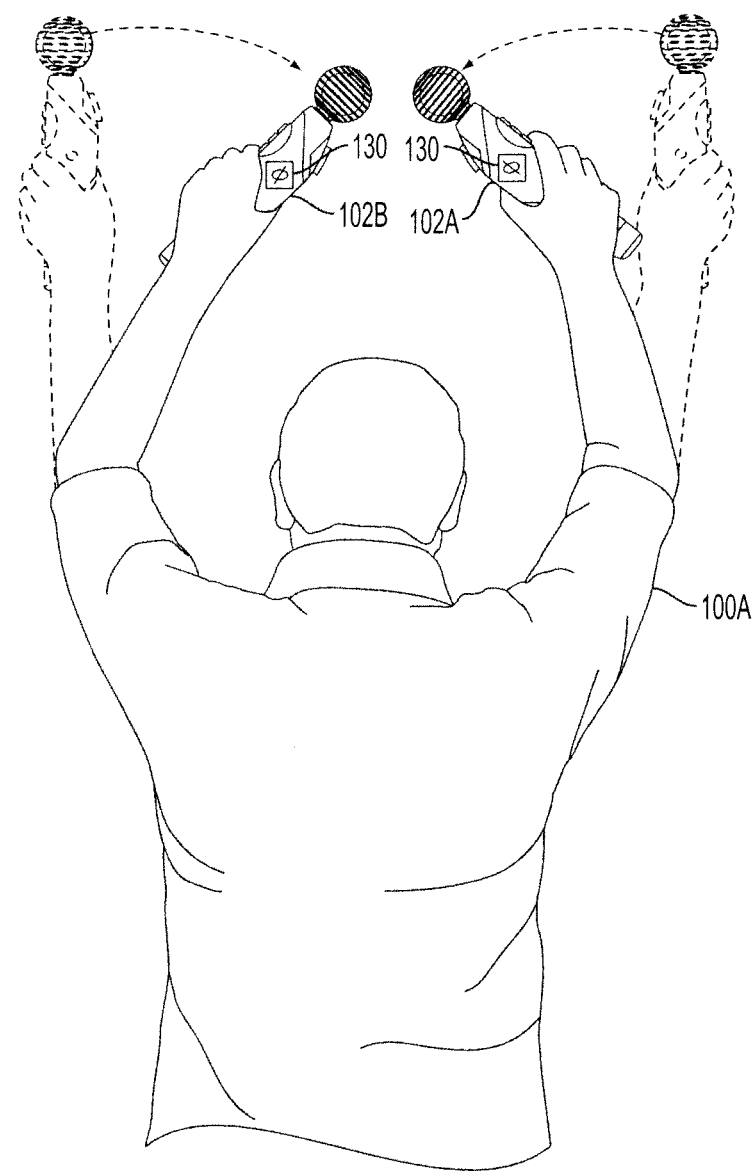
FIG. 12A illustrates pairing of a main controller and a secondary controller using a gyroscope, in accordance with one embodiment of the present invention.

FIG. 12A illustrates pairing of the controllers using a gyroscope, in accordance with one embodiment of the present invention. Gestures and movements by the user of the controllers 102A and 102B may be translated as inputs to a game in addition to or instead of conventional button or joystick commands. The controllers 102A and 102B may further include a gyroscope 130, which is a device for measuring or maintaining orientation, based on inertial sensing. The gyroscope 130 can used to pair the controllers 102A and 102B. In one embodiment, the player 100A tilts of both controllers 102A and 102B, and the gyroscope 130 detects amount of tilting of the controllers 102A and 102B. Once the gyroscope 130 of each controller 102A and 102B is above the threshold level, the controllers 102A and 102B transmit the pairing initiation signal to the base computing device. The contact can, in one example, be just a gentle touch of the controller to the ear piece.

Figure 12B:
FIG. 12B illustrates pairing a Bluetooth® headset with controller, in accordance with one embodiment of the present invention.

FIG. 12B illustrates pairing a Bluetooth® headset with controller, in accordance with one embodiment of the present invention. One popular genre of games is online gaming. Often in online games, the player may be in communication with remote players connected to the Internet or network, but who are also directly or partially involved in the interactivity of the game. A player 100A can use Bluetooth® headset in conjunction with the controller 102A for online gaming. A typical Bluetooth® headset 150 includes a microphone input 152 to enable accurate speech recognition required to support "voice command" and "voice animation" features, as well as the communication with remote players, which are part of select interactive games.

In one embodiment, the Bluetooth® headset 150 can further include an accelerometer (not shown), which can be used to detect physical contact that occurs with the Bluetooth® headset 150. An accelerometer included in the controller 102A detects the contact between the Bluetooth® headset 150 and the controller 102A. The controller 102A and Bluetooth® headset 150 transmit the pairing initiation signal to the base computing device in response to physical contact between the Bluetooth® headset 150 and the controller 102A. The contact can, in such an example, be just a gentle touch of the controller to the ear piece. In another embodiment, the pairing between the controller 102A and the Bluetooth® headset 150 can be accomplished using the microphone input 152 of the Bluetooth® headset 150. The contact between the controller 102A and the Bluetooth® headset 150 can be detected through the microphone input 152 resulting from the sound generated by the contact. In this embodiment, the time stamp generated as a result of the sound detected by the microphone input 152 of the Bluetooth® headset 150 is compared to the time stamp of generated by the controller 102A in response to the accelerometer of the controller 102A detecting the physical contact.

Figure 13A:
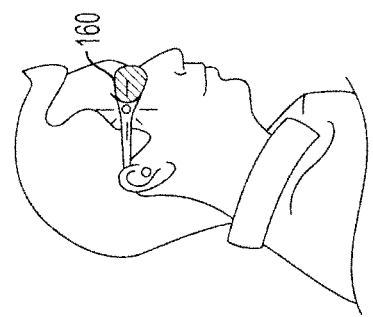
FIGS. 13 and 13A illustrates an example in which a first video feed comprised of lines A and a second video feed comprised of lines B are shown on the same monitor and viewed by players using pairs of LCD shutter glasses.
Figure 13:
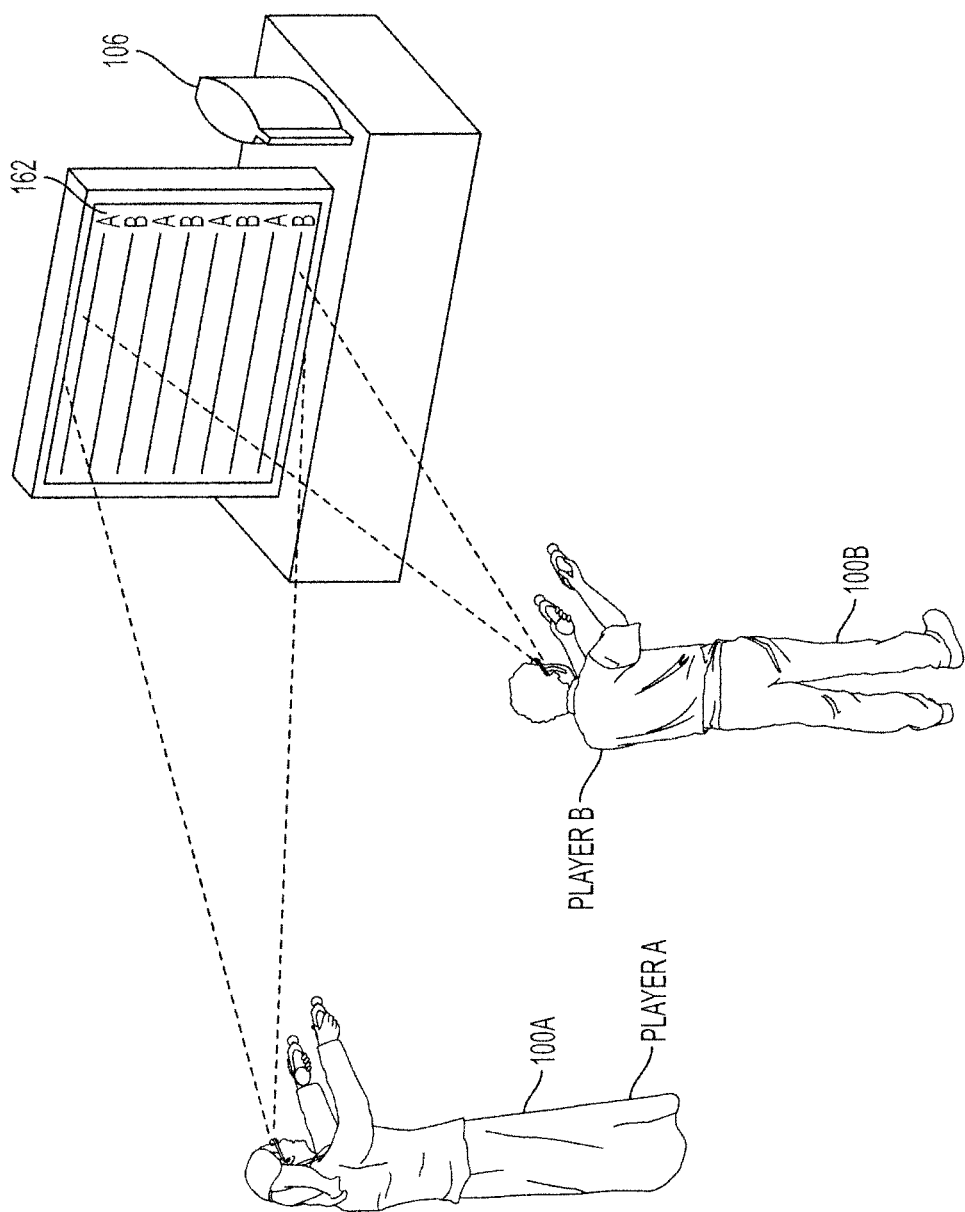

FIG. 13 illustrates an example in which a first video feed comprised of lines A and a second video feed comprised of lines B are shown on the same monitor and viewed by players using pairs of LCD shutter glasses. Optionally, other wirelessly enabled peripheral devices such as the Playstation Portable® device, a portable computing device, a smart phone, a Bluetooth® headset, or a pair of liquid crystal display (LCD) shutter glasses 160 may interact with the base computing device. In one embodiment, a pair of LCD glasses 160 can interact with the base computing device. FIG. 13A illustrates a close up example in which one of the players wears a pair of LCD shutter glasses that can be used to implement embodiments of the present invention. The images of the two video feeds are interlaced and the video lines of an image from one video feed A are interleaved with the lines of an image from the other video feed B. In other words, the odd-numbered lines taken from an image from the first video feed A are displayed, and then the even-numbered lines taken from an image from the second video feed B are displayed. The monitor 162 alternately displays a video line from each video feed, resulting in the displayed sequence of video lines shown in the screen of FIG. 13. Further examples are found in: (1) U.S. application Ser. No. 12/503,846, entitled "Display Viewing system and Methods for Optimizing Display View Based On Active Tracking", filed on Jul. 16, 2009, and (2) U.S. application Ser. No. 11/732,830, entitled "Screen Sharing Method and Apparatus", filed on Apr. 3, 2007, each of which is incorporated by reference.

In one embodiment, the lenses of a pair of LCD shutter glasses 160 are either both open or both shuttered at the same time and are synchronized to the images from one of the displayed video feeds A or B to allow the wearer to view the video lines associated from that video feed. For instance, a first pair of LCD shutter glasses 160 is synchronized to the frames of first video feed A. The first pair of LCD shutter glasses 160 is open when the frames of the first video feed A are shown on the display 162 and shuttered when the frames of the second video feed B are shown on the display 162. The player 100A viewing the display 104 through the first pair of LCD shutter glasses 160, would therefore only see the frames of the first video feed A and would not see the frames of the second video feed B. Similarly, the second pair of LCD shutter glasses 160 is synchronized to the frames of the second video feed B. The second pair of LCD shutter glasses 160 is open when the video lines of the second video feed B are shown on the display 162 and shuttered when the video lines of the first video feed A are shown on the display 162. Thus, the player 100B viewing the display 162 through the second pair of LCD shutter glasses 160, would therefore only see the frames of the second video feed B and would not see the frames of the first video feed A. In another embodiment the first video feed A and the second video B alternately display an entire frame on the display 104 at a high frame rate. As discussed above, the LCD shutter glasses 160 open at times when frames from the first video feed A are to be viewed by player 100A. The LCD shutter glasses 160 open at times when frames from the second video feed B are to be viewed by player 100B.

Additionally, one or more players 100A and 100B can share a three-dimensional (3D) presentation of video feeds A and B (or more feeds). For instance, the first video feed A presents a frame of the video feed from a first perspective and the second video feed B presents a frame of the video feed from a second perspective. To attain the 3D effect, the left and right shutters of each pair of LCD shutter glasses 160 are synchronized to different displayed images. The left shutter of one of the pairs of LCD shutter glasses 160 is synchronized to view the left image frame provided by the first video feed A, and the right shutter of that pair of LCD shutter glasses 160 is synchronized to view the right image frame provided by the second video feed B. Similarly, the left shutter of another pair of LCD shutter glasses 160 is synchronized to view the left image frame from the first video feed A, and the right shutter of that pair of LCD shutter glasses 160 is synchronized to view the right image frame from the second video feed B. As a result, both players 100A and 100B are able to view the video in 3D.

In one embodiment, the LCD shutter glasses 160 may further include an accelerometer. The first player/viewer 100A would tap their LCD shutter glasses 160 on a surface, such as the base computing device 106 or the display 162, when prompted by the base computing device 106 to indicate viewing the first video feed A. The second viewer/player 102B would tap their LCD shutter glasses 160 when prompted by the base computing device 106 to indicate viewing the second video feed B. The accelerometer in the LCD shutter glasses 160 of each player 100A and 100B detects physical contact generated by the tap and in response, the LCD shutter glasses 160 transmits pairing initiation signal to the base computing device 108.

In another embodiment, a player may pair a combination of controllers (one or two), a Bluetooth® headset, and LCD shutter glasses to join a multimedia feed. When in pairing mode, the function of pairing can be through tapping devices to each other, being devices close to each other, etc. As such, each of these devices can be paired to one player to form an ad-hoc group of devices. In one example, the LCD shutter glasses 160 would present a video feed (e.g., a movie), while the audio portion is transmitted through the Bluetooth® headset (to transmit, for example, a director's commentary). The controllers in the user's hands can be used control the viewing of the video feed (e.g., pause, fast forward, rewind, and/or record or other playback functions).

While the devices are paired in this ad-hoc group of devices (associated to one user), the user may opt to switch from the current multimedia feed to another. For instance, if the user decides to stop watching the movie and now desires to switch to game playing, one embodiment will ensure that all devices that are currently paired together switch together. That is, the user's paired controllers, LCD shutter glasses and Bluetooth® headset will switch to game mode, allowing the user to view the game with the LCD shutter glasses, communicate with online game players (e.g., chat) with the Bluetooth® headset, and interact with the controllers. The directive to switch multiple devices (as a group) from one multimedia feed to another can be triggered from a button push on the controllers, voice command, or gesture motion by one or both controllers. So long as the group of devices are paired together, the user can continue to switch in or out of multimedia feeds, internet surfing, chats, etc.

In one embodiment, the user may desire to un-pair one or more of the grouped devices. For instance, if the user joins a game feed, but wants to use his Bluetooth® headset to initiate a telephone call, the user can un-join (un-pair) the Bluetooth® headset by taping the headset to one of the other paired devices, pushing a button, or triggering a command via the controllers, selecting a GUI (graphical user interface) icon(s), or the like. In this embodiment, therefore, it is possible to join multiple groups of devices, switch groups of devices from feed to feed, and un-join one or more devices from the group.

Figure 13B:
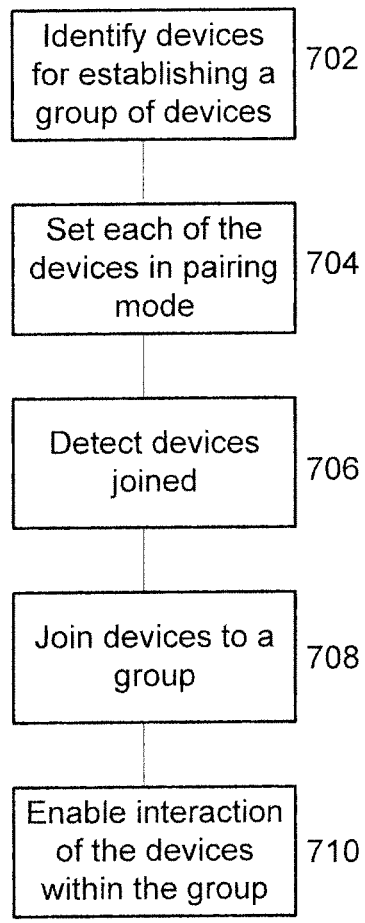
FIGS. 13B and 13C illustrate flow process examples of the grouping of devices and the switching of devices as a group.
Figure 13C:
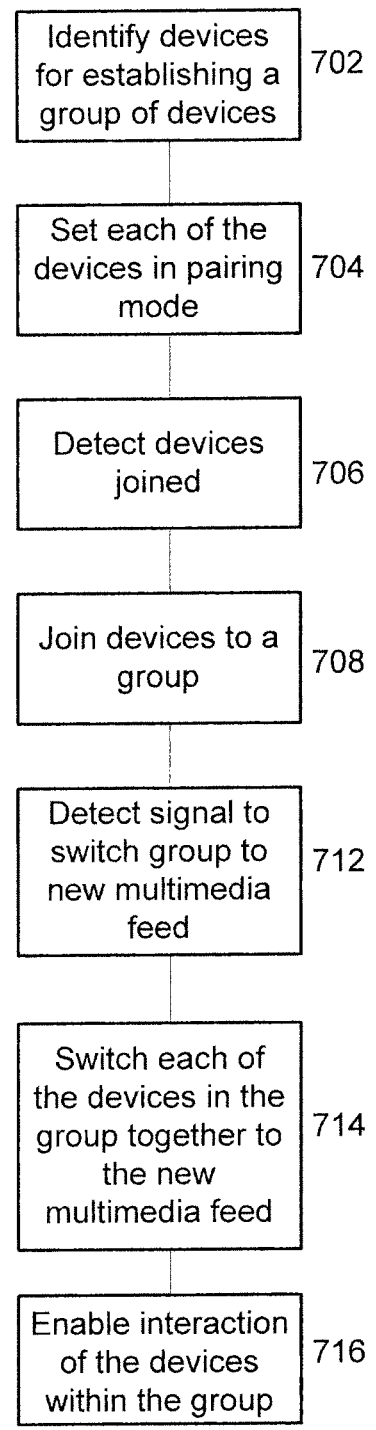

FIGS. 13B and 13C illustrate flow process examples of the grouping of devices and the switching of devices as a group. In operation 702, a user or users desiring to pair devices identify the devices. Various embodiments are possible for selecting devices. In one embodiment, all of the devices can be for one user, as discussed above. In another embodiment, some devices can be for one user and other devices can be for another user (e.g., player A and player B, wishing to play a game together). In operation 704, the devices identified for grouping are placed in pairing mode.

While in paring mode, operation 706 detects when devices are joined. In one embodiment, devices are joined when users tap devices together. For instance, if three devices are to be joined, the user/users can tap two devices together, and then can tap the third device to any one of the two already paired devices. To add more devices, this process can continue. To remove devices, users can double tap two devices, push a button, or select a command. In operation 708, the system (e.g., base station or console) will maintain a database of pairings, in which the group of joined devices is maintained. The database of pairings can be maintained for one session or multiple sessions, depending on the context of the interactivity. For instance, if a group of users joins regularly for a session of interactivity, users can recall the pairing for a group from a menu or recall a pairing from a list. This enables fast pairing from previously saved pairing group data kept in a database, or downloaded from the internet.

In operation 710, a user or users of the paired group can interact with the devices, while communication is maintained between the paired group of devices. This communication can continue until one or more of the devices is un-paired from the group.

In FIG. 13C, a signal, command, or trigger can be detected from one of the paired devices, that an intent to switch the group from one multimedia feed to another was initiated 712. As mentioned above, because the devices being paired can take on different functions, it is possible to switch devices to various types of interactivity, communication or sessions. The switching is broadly described as being from one multimedia feed to another multimedia feed. As used herein, a "multimedia feed" can include interactive games, chat communication, gesture communication, gaming, business interactions, document sharing, video sharing, a mixture of the various media, and/or parts of different medias provided to different devices, based on the capabilities of the particular devices.

For instance, voice can go to the headset, vibration can go to the controller, video can go on the display or video glasses, etc. In operation 714, based on the detected switch signal, each of the paired devices, for a given group, will switch to the new feed together. The synchronous switch allows a user or users to move into and out of interactive environments (or feeds) in an effortless way, while ensuring that the data intended for particular devices is channeled to the capable devices of the group. In operation 716, the user or users of the group can resume interaction in the new multimedia feed, until a new switch action is received for the group.

Figure 14:
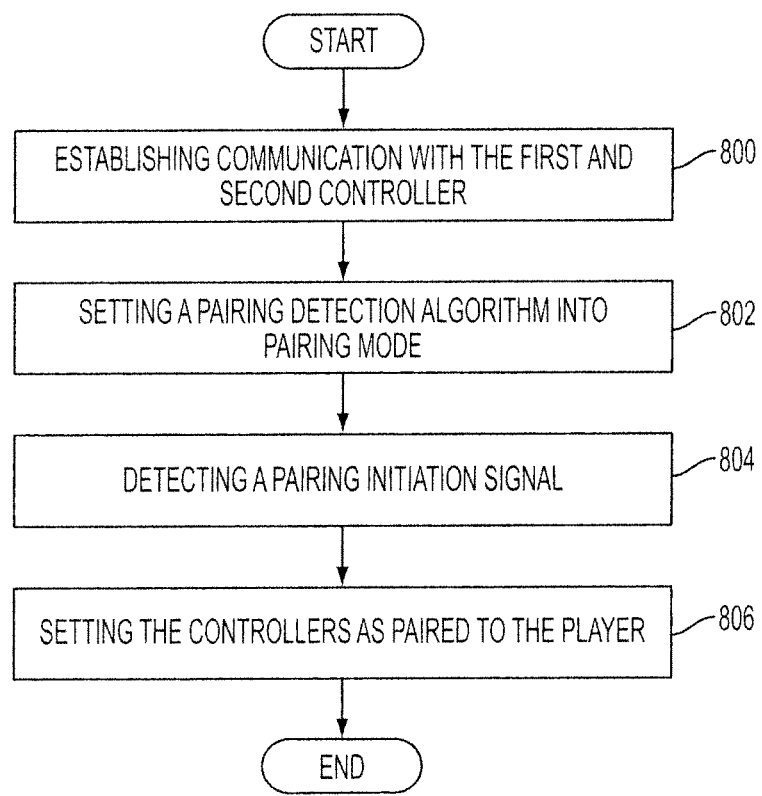
FIG. 14 is a simplified schematic diagram illustrating a method for pairing controllers to a base computing device in preparation for playing a game executed on the base computing device, in accordance with one embodiment of the invention.

FIG. 14 is a simplified schematic diagram illustrating a method for pairing controllers to a base computing device in preparation for playing a game executed on the base computing device, in accordance with one embodiment of the invention. The method initiates with operation 800 in which communication is established between the base computing device and the first and second controller. In operation 802, the pairing detection algorithm of the base computing device is set into pairing mode. In embodiments discussed above, the base computing device executes the pairing detection algorithm, which is set to pairing mode and awaits detection of the pairing initiation signal. In one embodiment, the pairing detection algorithm can be implemented as part of an event loop of an event-driven program executed on the base computing device.

The method advances to operation 804, where when the base computing device is in pairing mode, the pairing detection algorithm detects a pairing initiation signal. In one embodiment, the controllers transmit the pairing initiation signal to the base computing device in response to physical contact between the controllers, as illustrated in FIG. 2. In another embodiment, the controllers transmit the pairing initiation signal to the base computing device in response to local communication signature between the controllers, as illustrated in FIG. 8. In operation 806, the base computing device sets the controllers as being paired to the player.

Figure 15:
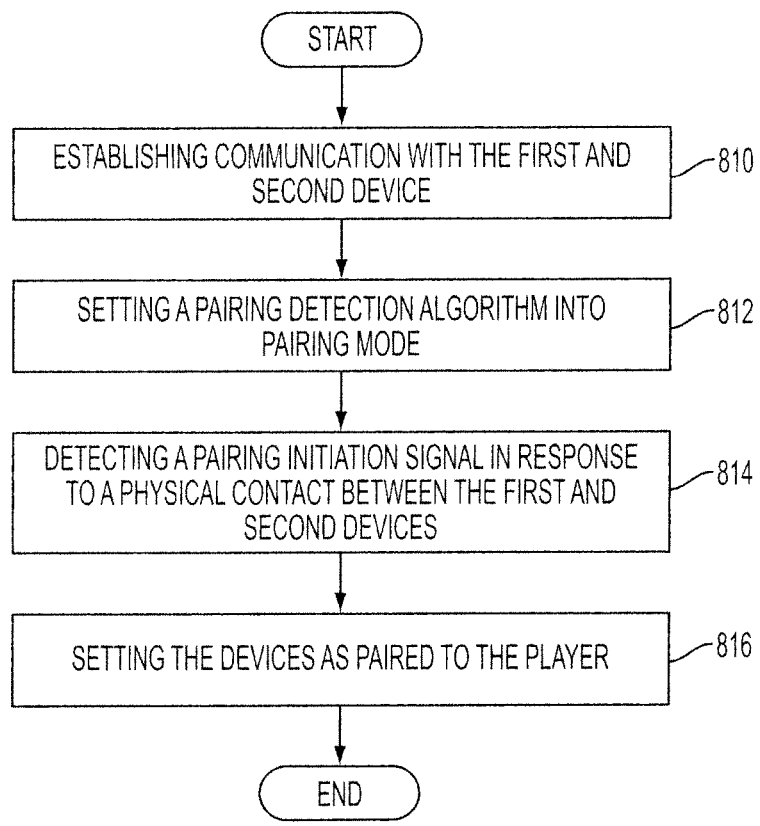
FIG. 15 is a simplified schematic diagram illustrating a method of pairing devices to a base computing device in preparation for playing a game executed on the base computing device, in accordance with one embodiment of the invention.

FIG. 15 is a simplified schematic diagram illustrating a method of pairing devices to a base computing device in preparation for playing a game executed on the base computing device, in accordance with one embodiment of the invention. The method initiates with operation 810 in which the base computing device establishes communication with the devices. In one embodiment, the devices are a controller and a Bluetooth® headset, as illustrated in FIG. 12. The method advances to operation 812, where the pairing detection algorithm of the base computing device is set into pairing mode. In operation 814, where the base computing device in pairing mode detects a pairing initiation signal that is transmitted in response to physical contact between the devices. In one embodiment, the controllers transmit the pairing initiation signal to the base computing device in response to physical contact between controller and a Bluetooth® headset, as illustrated in FIG. 14. In operation 816, the base computing device sets the devices as being paired to the player. In one embodiment, a pair of LCD shutter glasses is paired with a player for 3D viewing, as illustrated in FIG. 13.

Figure 16:
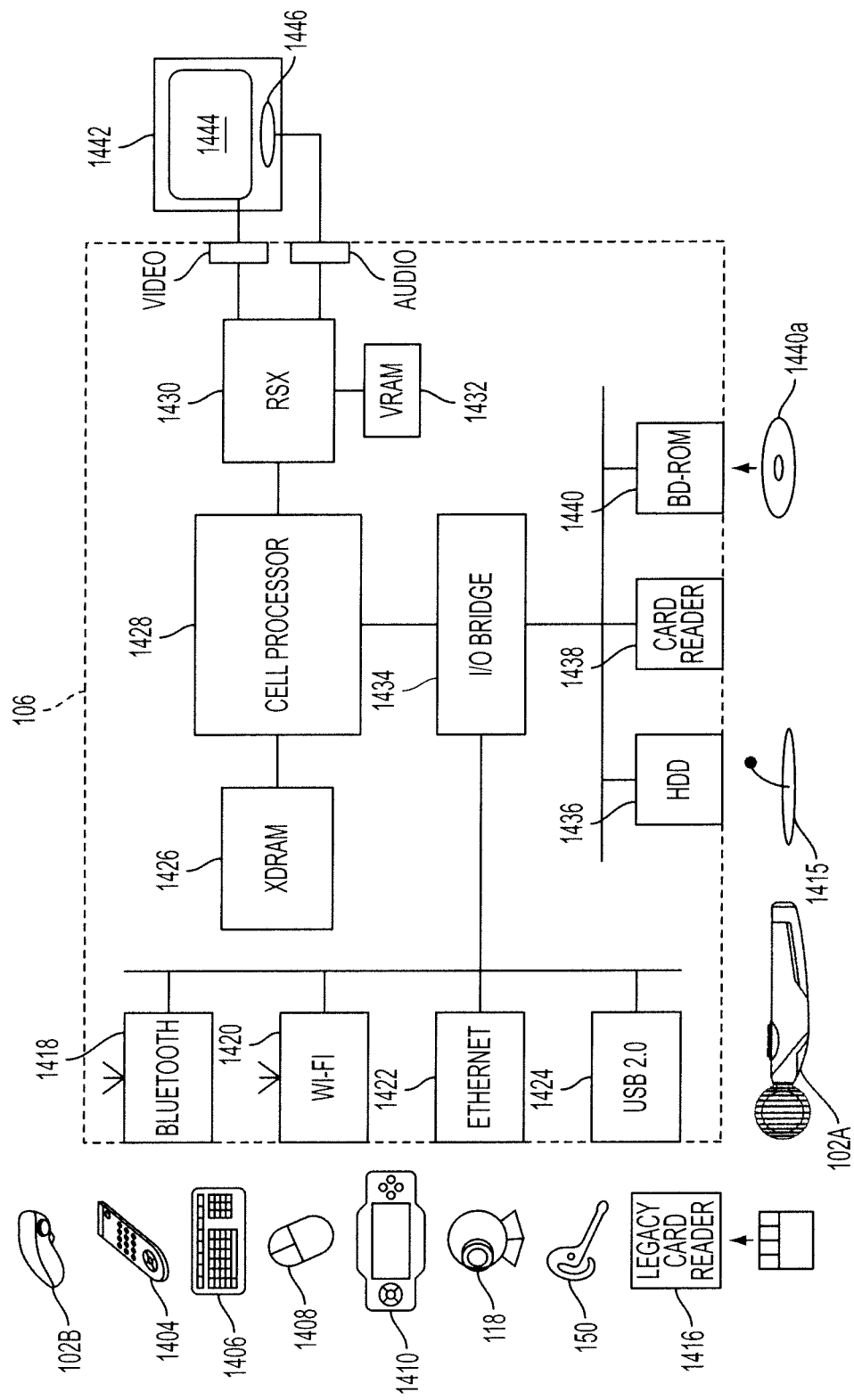
FIG. 16 schematically illustrates the overall system architecture of the Sony® Playstation 3® entertainment device, a base computing device that may be compatible for implementing controller pairing methods, in accordance with embodiments of the present invention.

FIG. 16 schematically illustrates the overall system architecture of the Sony® Playstation 3® entertainment device, a base computing device that may be compatible for implementing controller pairing methods, in accordance with embodiments of the present invention. A base computing device 106 is provided, with various peripheral devices connectable to the base computing device 106. The base computing device 106 comprises: a Cell® processor 1428; a Rambus® dynamic random access memory (XDRAM) unit 1426; a Reality Synthesizer graphics unit 1430 with a dedicated video random access memory (VRAM) unit 1432; and an I/O bridge 1434. The base computing device 106 also comprises a Blu Ray® Disk BD-ROM® optical disk reader 1440 for reading from a disk 1440a and a removable slot-in hard disk drive (HDD) 1436, accessible through the I/O bridge 1434. Optionally the base computing device 106 also comprises a memory card reader 1438 for reading compact flash memory cards, Memory Stick® memory cards and the like, which is similarly accessible through the I/O bridge 1434.

The I/O bridge 1434 also connects to a number of Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth® connections.

In operation, the I/O bridge 1434 handles all wireless, USB and Ethernet data, including data from one or more game controllers 102A-102B. In one embodiment, referring back to FIG. 14, the I/O bridge 1434 receives the pairing initiation signal from the game controllers 102A and 102B via a Bluetooth® link and directs the pairing initiation signal to the Cell® processor 1428 executing the pairing detection algorithm, which sets the controllers 102A and 102B as paired.

The wireless, USB and Ethernet ports also provide connectivity for other peripheral devices in addition to game controllers 102A and 102B, such as: a remote control 1404; a keyboard 1406; a mouse 1408; a portable entertainment device 1410 such as a Sony® Playstation Portable® entertainment device; a video camera such as an EyeToy® video camera 118; a microphone headset 150; and a microphone 1415. Such peripheral devices may therefore in principle be connected to the base computing device 106 wirelessly; for example the portable entertainment device 1410 may communicate via a Wi-Fi ad-hoc connection, while the microphone headset 150 may communicate via a Bluetooth® link.

The provision of these interfaces means that the Playstation 3® device is also potentially compatible with other peripheral devices such as digital video recorders (DVRs), set-top boxes, digital cameras, portable media players, Voice over IP telephones, mobile telephones, printers and scanners.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

The embodiments may also use an Information Service Provider architecture. Information Service Providers (ISP) deliver a multitude of information services to users geographically dispersed and connected via network. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP includes Application Service Provider (ASP), which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Further, ISP includes a Game Processing Server (GPS) which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Providers provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchanges interconnects the several modules inside ISP and connects these modules to users via networks. Data Exchanges can cover a small area where all the modules of ISP are in close proximity, or can cover a large geographic area when the different modules are geographically dispersed. For example, Data Exchange can include a fast Gigabit Ethernet (or faster) within a cabinet of a data center, or an intercontinental virtual area network (VLAN).

Users access the remote services with a client device, which includes at least a CPU, a display and I/O. The client device can be a PC, a mobile phone, a netbook, a PDA, etc. In one embodiment, an ISP recognizes the type of device used by the client and adjusts the communication method employed. In other cases, client devices use a standard communications method, such as html, to access the ISP.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of pairing controllers to a base computing device in preparation for playing a game executed on the base computing device, comprising:
   (a) establishing communication between a first and second controller and the base computing device, the communication identifying each of the first and second controllers as active;
   (b) setting, at the base computing device, a pairing detection algorithm into pairing mode for receiving signals from at least one of the first and second controllers as indicative of pairing between the first and second controllers;
   (c) detecting a pairing initiation signal, at the base computing device, from at least one of the first or second controllers, the pair initiation signal being generated in response to detecting physical contact between the first and second controllers, wherein in response to detecting physical contact between the first and second controllers, the second controller transmits a controller signature signal to the first controller, the controller signature signal triggering the first controller to transmit the pairing initiation signal to the base computing device; and
   (d) setting the first and second controllers as paired to one player at the base computing device.

2. The method of pairing controllers as recited in claim 1, wherein the pairing initiation signal from the first controller contains pairing data for the first and the second controller.

3. The method of pairing controllers as recited in claim 1, further comprising:
   for additional pairs of controllers, processing (a)-(d), so as to establish the additional pairs of controllers as paired to another player at the base computing device.

4. The method of pairing controllers as recited in claim 1, wherein the physical contact is tapping between a surface of the first and second controllers.

5. The method of pairing controllers as recited in claim 1, wherein the setting the first and the second controller as paired further comprises:
(e) applying at the first and the second controller a pairing indicator, the pairing indicator providing a visible display indicating the first and second controllers are paired to the player.

6. The method of pairing controllers as recited in claim 1, further comprising:
(e) detecting an unpairing signal, at the base computing device, from the first and second controllers, the unpairing signal generated in response to detected physical contact between the first and second controllers after pairing; and
(f) removing pairing between the first and second controllers and the player.

7. The method of pairing controllers as recited in claim 1, wherein the pairing initiation signal provides pairing data including one type of pairing mode, controller identification data, controller type data, or time stamp data.

8. A method of pairing controllers to a base computing device using local communication signatures, comprising:
(a) establishing communication between a first and second controller and the base computing device, the communication identifying each of the first and second controllers as active;
(b) setting, at the base computing device, a pairing detection algorithm into pairing mode for receiving signals from either the first and second controllers as indicative of pairing between the first and second controllers;
(c) detecting a pairing initiation signal, at the base computing device, from either the first and second controllers, the pair initiation signal being generated in response to detecting local communication signature between the first and second controllers;
(d) setting the first and second controllers as paired to one player at the base computing device; and
(e) detecting an unpairing signal, at the base computing device, the unpairing signal generated in response to detected physical contact between the first and second controllers after the pairing had been set; and
(f) removing pairing, at the base computing device, between the first and second controllers and the player.

9. The method of pairing controllers as recited in claim 8, further comprising:
for additional pairs of controllers, processing (a)-(d), so as to establish the additional pairs of controllers as paired to another player at the base computing device.

10. The method of pairing controllers as recited in claim 8, wherein the pairing detection algorithm further comprises:
(e) processing the pairing initiation signal;
(f) identifying each controller through controller identification data in the pairing initiation signal; and
(g) correlating time stamp information of the pairing initiation signal to determine pairing of the first and second controller, such that the controllers with time stamp information closest in time are paired.

11. The method of pairing controllers as recited in claim 8, wherein the local communication signature is selected from one of (i) ultrasound signals, (ii) infrared emissions, (iii) visible light, (iv) tilting of the controllers, or (v) a change of capacitance.

12. The method of pairing controllers as recited in claim 8, wherein the pairing initiation signal is generated in response to the detected local communication signature being above a threshold value.

13. The method of pairing controllers as recited in claim 8, wherein the first controller serves as a main controller and the second controller serves as a secondary controller.

14. A method of pairing devices to a base computing device in preparation for playing a game executed on the base computing device, comprising:
(a) establishing communication between a first and second device and the base computing device, the communication identifying each of the first and second devices as active;
(b) setting, at the base computing device, a pairing detection algorithm into pairing mode for receiving signals from the first and second devices as indicative of pairing between the first and second devices;
(c) detecting a pairing initiation signal, at the base computing device, from either the first or second devices, the pairing initiation signal being generated in response to detecting physical contact between the first and second devices; the pairing initiation signal being received from one of the first or second devices upon said first and second devices exchanging a controller signature signal in response to the physical contact; and
(d) setting the first and second devices as paired to one player at the base computing device.

15. The method of pairing devices as recited in claim 14, wherein devices are selected from pairs of devices, where each device is selected from one of controllers, LCD shutter glasses, cell phone, Bluetooth® headset, or Playstation® Portable device.

16. The method of pairing devices as recited in claim 15, wherein LCD shutter glasses are in communication with the base computing device after pairing, enabling viewing of a video feed on a display in 3-dimensions.

17. The method of pairing devices as recited in claim 14, further comprising:
for additional devices, processing (a)-(d), so as to establish the additional devices as paired to another player at the base computing device.

18. The method of pairing devices as recited in claim 14, wherein the pairing initiation signal is generated in response to the detected physical contact being above a threshold value.

19. The method of pairing devices as recited in claim 16, wherein a controller and a Bluetooth® headset are paired for playing an online game.

* * * * *